United States Patent [19]
Smith et al.

[11] Patent Number: 5,905,244
[45] Date of Patent: May 18, 1999

[54] ARC RESISTANT METAL-CLAD SWITCHGEAR

[75] Inventors: James E. Smith, Bethel Park; Douglas M. Brandt, Ellwood City, both of Pa.

[73] Assignee: Eaton Corporation, Cleveland, Ohio

[21] Appl. No.: 09/102,181

[22] Filed: Jun. 22, 1998

[51] Int. Cl.[6] .......................... H01H 33/02; H01H 33/08
[52] U.S. Cl. ........................ 218/155; 335/202; 361/616; 200/50.17
[58] Field of Search ..................................... 361/835, 609, 361/615, 616, 725, 726, 727, 605, 606, 600; 218/155–157, 149, 15, 34, 35, 51–2, 76, 103; 335/201–202; 200/50.17, 50.12, 50.18, 50.21, 50.23

[56] References Cited

U.S. PATENT DOCUMENTS

| | | | |
|---|---|---|---|
| 3,339,118 | 8/1967 | Harner et al. | 361/616 |
| 3,376,086 | 4/1968 | Fisher | 361/605 |
| 4,126,232 | 11/1978 | Orawiec | 212/11 |
| 5,304,755 | 4/1994 | Romano et al. | 200/50 A |

OTHER PUBLICATIONS

Hugo Sulzer: Cutler–Hammer VacClad–W Arc Resistant Switchgear—The Result of Innovative Technology; 12 pgs. (Apr. 1996).

ABB Power T&D Company, Inc. brochure entitled "SafeGear™—The most advanced ANSI switchgear in the world."; 11 pgs. (undated).

*Primary Examiner*—Lincoln Donovan
*Attorney, Agent, or Firm*—Martin J. Moran

[57] ABSTRACT

Upper and lower compartments are provided in metal-clad switchgear that are mirror images of each other. The compartments have doors that move toward one another to lock. The upper compartment has rails at the bottom for receiving a fuse truck, and the lower compartment has a division sheet between the compartment that has openings in it for receiving mating projections on the doors.

21 Claims, 8 Drawing Sheets

ARC RESISTANT METAL-CLAD SWITCHGEAR

BACKGROUND OF THE INVENTION

1. Field of the Invention

This invention relates to arc resistant metal clad switchgear and particularly to switchgear having upper and lower compartments that are mirror images of one another and arc resistant doors to the compartments. The doors lock against a division sheet between the compartments.

2. Background Information

Metal-clad switchgear design is the first choice design of most consultants and utilities, particularly for medium voltage switchgear operating at voltages of from 5 to 38 KV. Circuit breakers and/or other elements in the switchgear are housed in metal enclosures and are removable. Drawout apparatus are used to move the circuit breakers or other elements between a disconnect position in which the primary contacts are fully disengaged and a connect position in which the primary contacts are fully engaged. The switchgear typically includes a variety of auxiliary devices and related control circuitry, including potential transformers, power transformers and fuse drawer compartments.

The metal-clad design for switchgear concentrates on structure that reduces the possibility of arcing faults within the enclosure. For instance, all primary elements such as breakers, voltage transformers and control power transformers have disconnect means with isolating shutters establishing isolation from the high voltage source.

All operations on breakers, potential transformers and control power transformers, engagement/isolation/test in metal-clad switchgear are preferably performed with the compartment doors closed for operator safety. The front door is interlocked with the shutter assembly to reduce the chance of accidental opening of the front door during even partial levering-in of the breaker/potential transformer/control power transformer drawout element.

The switchgear enclosures containing primary elements have been compartmentalized and grounded for maximum isolation and confinement such as the breaker compartment, main bus compartment and cable compartment. Within these compartments all live parts where possible are fully insulated reducing the possibility of an arcing fault to occur. This need to eliminate or reduce the possibility of an arcing fault has driven the design development to metal-clad switchgear construction for many years.

Although arcing faults are rare, injuries from arcing faults in metal-clad switchgear have continued. When it does occur, the results can be very destructive because of the energy levels reached within a confined compartment. The structural containment may be inadequate to prevent arcing products and hot gases escaping the faulted compartment. Burns can result if operating personnel are in close proximity to the faulted switchgear.

Arcing faults can occur within a switchgear compartment as a result of insulation failure or human error. The pressure from an electric arc is developed from two sources: the expansion of the metal in boiling, and the heating of air by the arc energy. Copper expands by a factor of 67,000 times in vaporizing. This accounts for the expulsion of near-vaporized droplets of molten metal from the arc. One test has shown that droplets could be propelled up to 10 feet. The pressure also generates plasma outward from the arc for distances proportional to the arc energy. One cubic inch of copper vaporizes into 1.44 cubic yards of vapor. The air in the arc stream expands in warming up from its ambient temperature to that of the arc temperature (approximately 35,000° F). All this happens within the first half cycle of the fault and results in a sudden, large rise in pressure inside of the compartment. Switchgear structure is needed to reduce arcing and contain such pressures and to prevent personal injury.

There are several known designs for metal-clad switchgear to allow the doors to withstand the pressure generated from an internal arcing fault, some of which are:

The doors are stiffened, using welded angles and channels and then bolted using many bolts around the perimeter of the door into weld nuts in the cell;

Multi point latch handles that when turned rotate pins or bars into hasps that brace the doors around the perimeter;

A special handle assembly that as the handle rotates the door is either pushed up or down causing mating notches to overlap—this overlapping of the notches gives the door latching system the ability to withstand the pressure; and A handle that turns a three point latch which extends steel pins into steel pads welded onto one side of the cell in combination with special hinges on the opposite side of the door.

Some medium voltage switchgear include upper and lower switchgear compartments and separate doors for the compartments. An improved switchgear enclosure and door latch system is needed for providing structural containment of pressure that may develop from possible arcing within the switchgear enclosure.

There is need, therefore, in switchgear having an improved latching mechanism for containing pressures that may result if arcing occurs in the switchgear.

There is a more particular need for improved switchgear having upper and lower fuse truck compartments that are mirror images of one another and doors on the compartments that provide improved arc resistance.

There is an additional need for such improved medium voltage switchgear which provides a more efficient and convenient arrangement of compartments and especially for an improved door latch system for the switchgear.

SUMMARY OF THE INVENTION

These needs and others are satisfied by the present invention that is directed to metal-clad switchgear having at least two compartments, one above the other, which are mirror images of one another, and in which the doors on the compartments move in opposite directions to be opened and closed. One of the compartments may be a circuit breaker or fused starter compartment and the other compartment may be an auxiliary compartment for a transformer or fuse truck, or both compartments may be auxiliary compartments for fuse trucks or other equipment.

This invention provides metal-clad switchgear having upper and lower compartments which are mirror images of one another and having a slotted division sheet between the doors to the compartments for the doors to lock into when they are latched or locked closed. As used herein, upper and lower mean that one compartment and its door are higher or above the other compartment and its door. The terms do not preclude the existence of additional compartments and doors above and/or below the upper and lower compartments and doors. The upper door has a plurality of projections along its lower edge and the lower door has a plurality of projections on its upper edge for engaging in the slots in the division sheet between the doors. The upper door is locked by lowering the door and the lower door is locked by raising the door.

Metal-clad switchgear of this invention further has locking means at the top of the upper door, the bottom of the lower door and preferably both vertical edges of both doors. These locking means are also locked when the upper door is lowered and the lower door is raised, and are unlocked when the doors are moved in the opposite directions. The switchgear includes handle mechanisms that move the doors up and down to lock and unlock them.

The primary objective of this invention is to provide metal-clad switchgear having upper and lower compartments in it that are mirror images of one another and in which the doors to the compartments are moved toward one another to lock them and away from one another to unlock them. This invention permits both doors to use the same horizontal member to lock against and also use overlapping tabs on the sides of the door to lock the sides of the door on the switchgear.

The above and other objects and advantages of the invention will be more fully understood and appreciated by reference to the following description and attached drawings.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
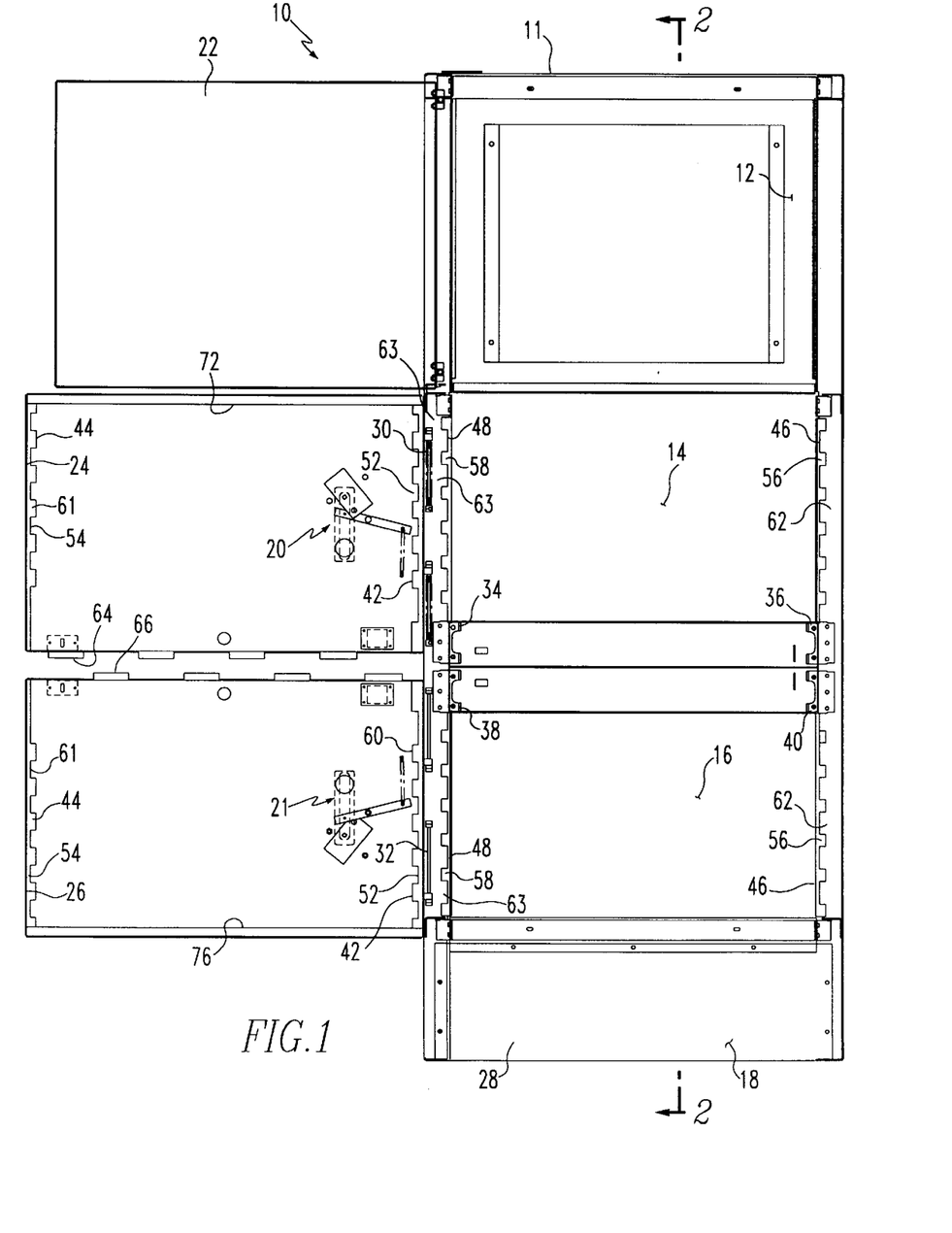
FIG. 1 is a front view of metal switchgear of this invention with the doors to the switchgear open.

FIG. 1 shows a preferred embodiment of metal-clad switchgear 10 of this invention that includes a sheet metal enclosure 11 having four compartments 12, 14, 16, 18 in it. The sheet metal enclosure 11 has doors 22, 24, 26 and 28 for closing the compartments 12, 14, 16 and 18. Doors 24, 26 are hinged to the enclosure 11 by hinges 30, 32. The top and bottom doors 22 and 28 may be hinged or otherwise attached to the enclosure 11 and form no part of this invention. In the preferred embodiment selected for illustration, the compartments include a top control compartment 12, an upper auxiliary compartment 14, a lower auxiliary compartment 16 and a bottom blank compartment 18 or potential transformer compartment. The particular use of each of the compartments is not critical to this invention. Any of the compartments can be for circuit breakers, potential transformers or auxiliary equipment such as fuse trucks and the like.

Figure 2:
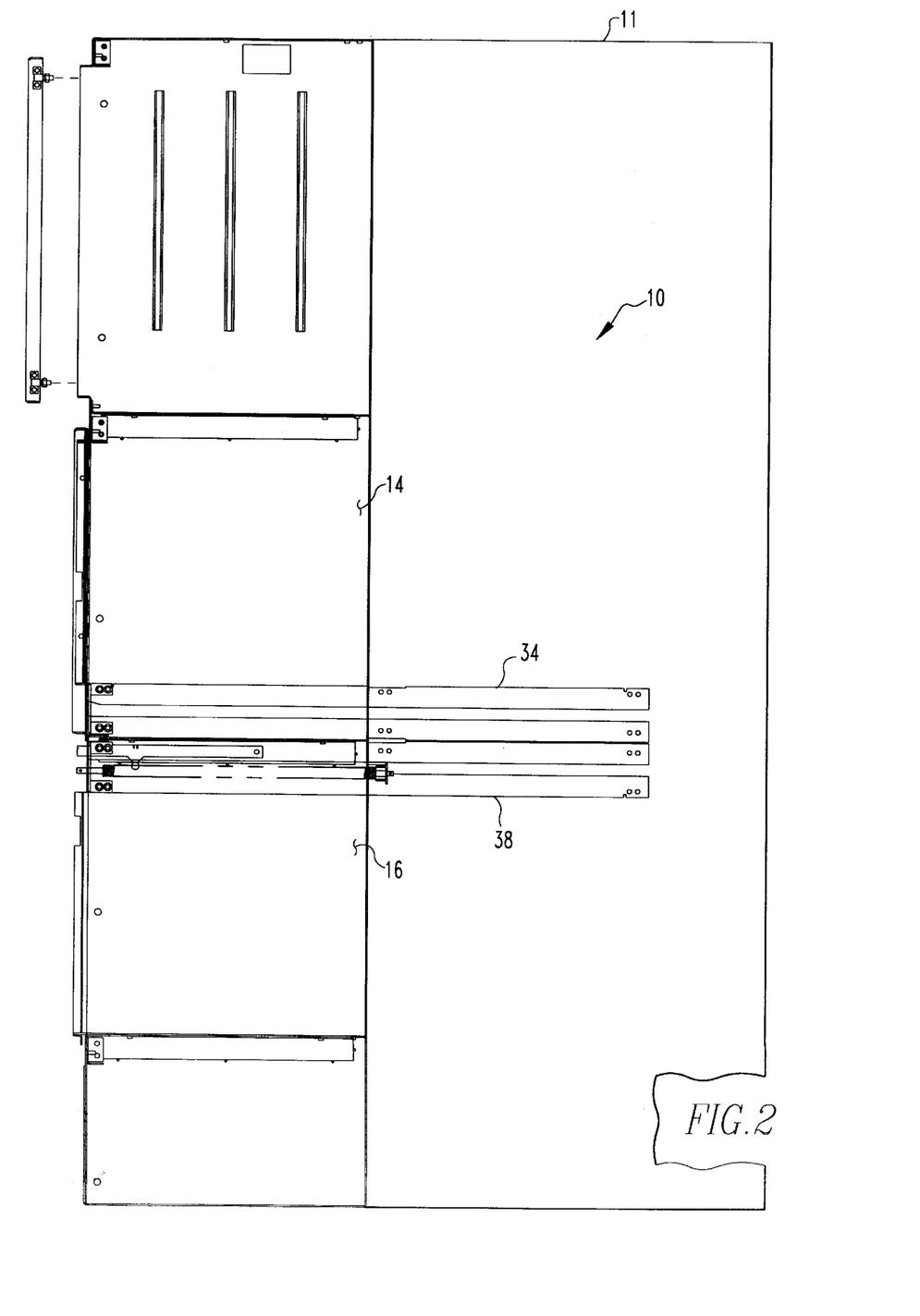
FIG. 2 is a vertical cross-sectional view of the switchgear of FIG. 1 taken along line 2—2 in FIG. 1.

An important aspect of this invention is that two of the compartments in the switchgear be mirror images of one another and that the door to the upper mirror image compartment is lowered to lock it and the door to the lower mirror image compartment is raised to lock it. In the embodiment selected for illustration, compartments 14 and 16 are mirror image compartments. The mirror image compartments include latching mechanisms 20, 21 and rails 34, 36, 38, 40 for fuse trucks, not shown. Two of the rails 34, 38 for carrying fuse trucks are better seen in FIG. 2 which is a cross-sectional view of the switchgear 10. Fuse trucks roll or slide back and forth within the switchgear from a fully inserted/connected position to a retracted/disconnected position as is known in the art. The rails 34, 36 are at the bottom of the upper auxiliary compartment 14, and rails 38, 40 are at the top of the lower auxiliary compartment 16. A fuse truck would sit on the rails 34, 36 in the upper compartment 14, and a fuse truck would hang, or be suspended, from the rails 38, 40 in the lower compartment 16. In a preferred embodiment, the fuse trucks remain within the enclosure 11, but this is not critical to this invention.

The doors 24 and 26 to the upper and lower compartments 14 and 16 and the system for locking and unlocking them are important parts of this invention. The hinges 30, 32 that connect doors 24, 26 to the enclosure 11 left hand side sheet must permit the doors to be moved vertically by locking mechanism 20, 21 during locking and unlocking of the doors. These hinges 30, 32 are described below in more detail, as are the locking mechanisms 20, 21 that raise and lower the doors 24, 26 to lock and unlock them.

Doors 24, 26 preferably have a plurality of tabs 42 along the vertical edge of each door on the side thereof opposite the hinges 30, 32, and more preferably have tabs 42, 44 along both vertical edges of the doors. The compartments also preferably have matching tabs 46, 48 along the vertical edge of the door openings to the compartments. The exact configuration of the tabs 42, 44, 46, 48 is not important, but only that they can be overlapped or not overlapped for locking and unlocking the doors 24, 26. The tabs 42, 44, 46, 48 have slots or openings 52, 54, 56, 58 between them so the tabs on the doors can move through the slots along the door openings without interference to open and close the doors 24, 26 when they are unlocked. The tabs 42, 44 and slots 52, 54 on the doors 24, 26 are preferably provided on re-entrant flanges 60, 61 on the edges of the doors 24, 26, and the tabs 46, 48 on the door openings are preferably provided on flanges 62, 63 on the door openings. A used herein, a "re-entrant" flange means a flange that is disposed on the interior side of the door or the enclosure and which projects inwardly toward the vertical centerline of the door.

When the doors 24, 26 are closed, they are locked by lowering the upper door 24 and raising the lower door 26.

This moves the tabs 42, 44 on the doors 24, 26 into position behind (toward the inside of the enclosure 11) the tabs 46, 48 on the door openings. In that position the tabs help to hold the door 24, 26 against being opened forcibly as by an explosion in the switchgear.

It is a special feature of this invention that the upper door 24 has a plurality of downwardly projecting tabs 64 along its bottom edge, and lower door 26 has a plurality of upwardly projecting tabs 66 along its upper edge, and that the enclosure 11 has a member such as a division sheet 68 between the compartments 14, 16. The division sheet 68 has a plurality of slots 70 (FIG. 3) in it into which the tabs 64, 66 project when the doors 24, 26 are locked. The tabs 64 in the upper door 24 and tabs 66 on the lower door 26 are preferably provided on flanges 65, 67 on the doors that project toward the inside of the enclosure as best seen in FIG. 4. The tabs 64, 66 project downwardly and upwardly, respectively, from the flanges 65, 67.

Figure 3:
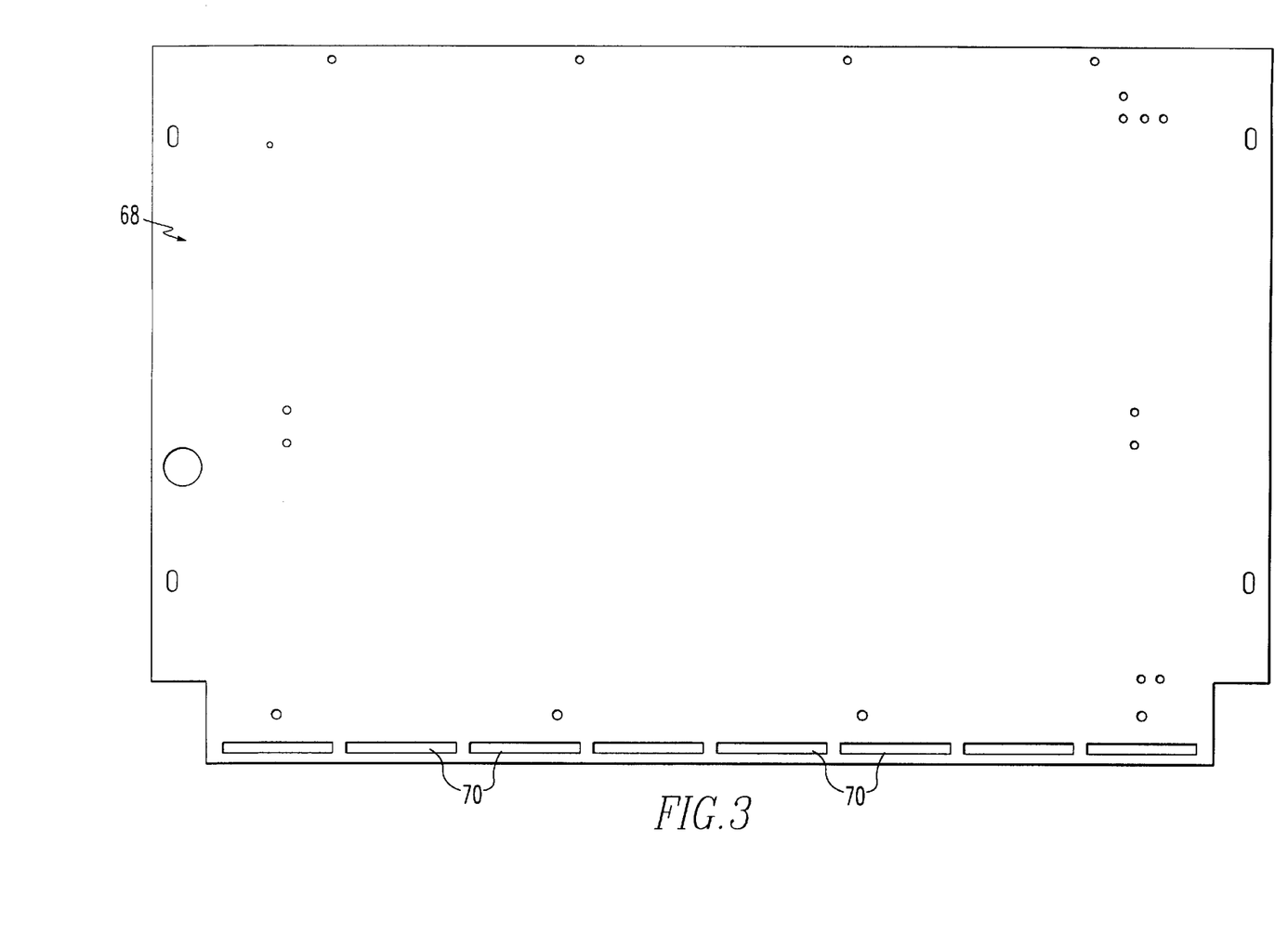
FIG. 3 is a plan view of a division sheet for the switchgear of FIGS. 1 and 2 before the sheet is assembled in the switchgear.
Figure 4:
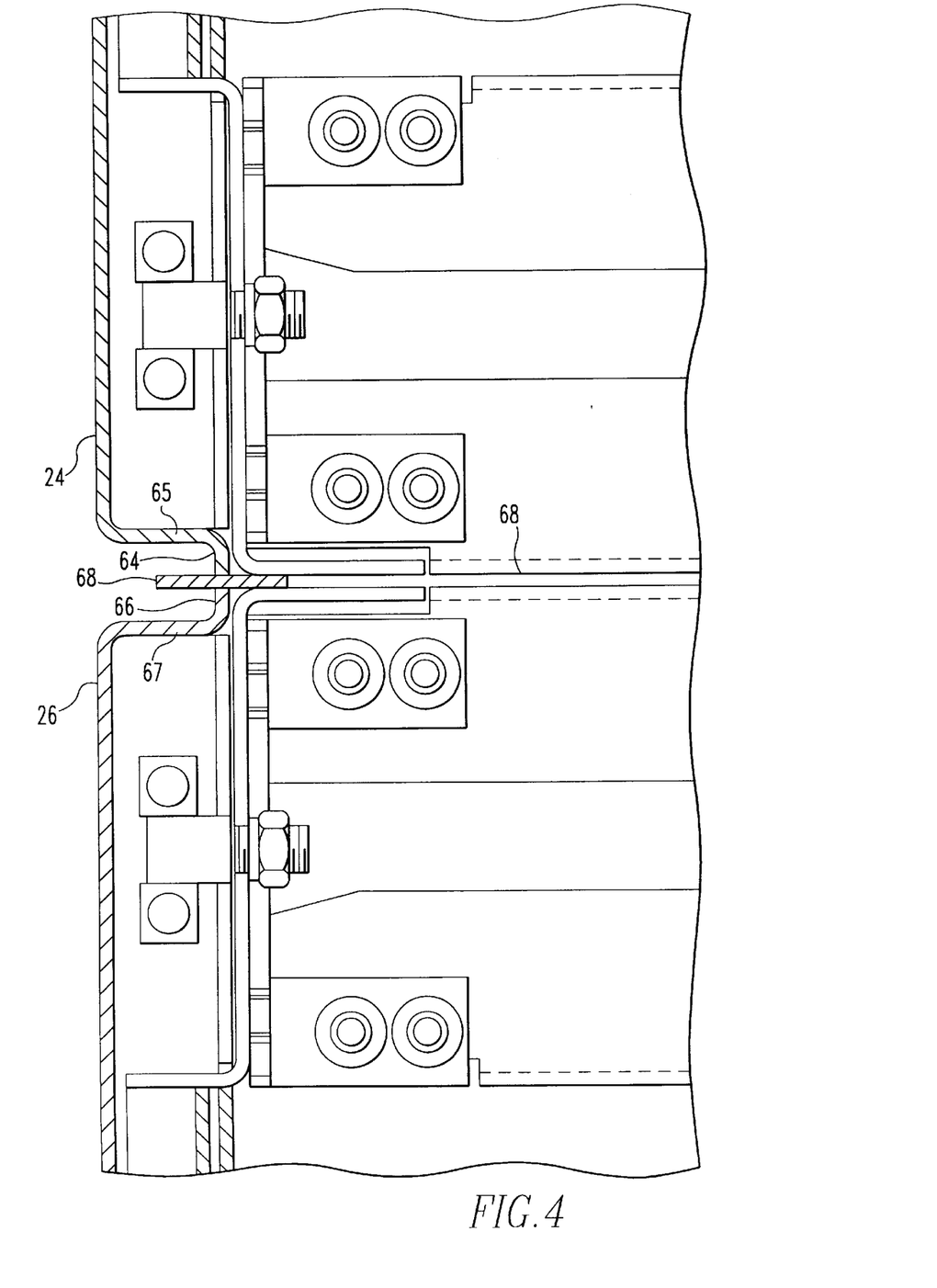
FIG. 4 is a fragmentary enlarged cross-section of the switchgear of FIGS. 1 and 2 taken through the doors and the division sheet between the doors.

The division sheet 68 is shown in FIG. 3 prior to its assembly in the switchgear 10. The division sheet 68 is preferably made of a sheet of steel that is bolted, welded or otherwise secured in the enclosure 11 between compartments 14, 16. The sheet 68 has a plurality of slots 70 across its front edge for receiving the tabs 64, 66 on doors 24, 26 when the doors are locked. In a preferred embodiment, the tabs 64 on the upper door 24 fit in every other slot 70 in the division sheet 68, and tabs 66 on the lower door 26 fit in the remaining slots. When the doors 24, 26 are locked, i.e., the upper door 24 is in its down position and the lower door 26 is in its up position, the engagement of the tabs 64, 66 on the door in the slots 70 in the division sheet 68 restrain the doors against being opened forcibly as by an explosion in the enclosure.

Figure 5:
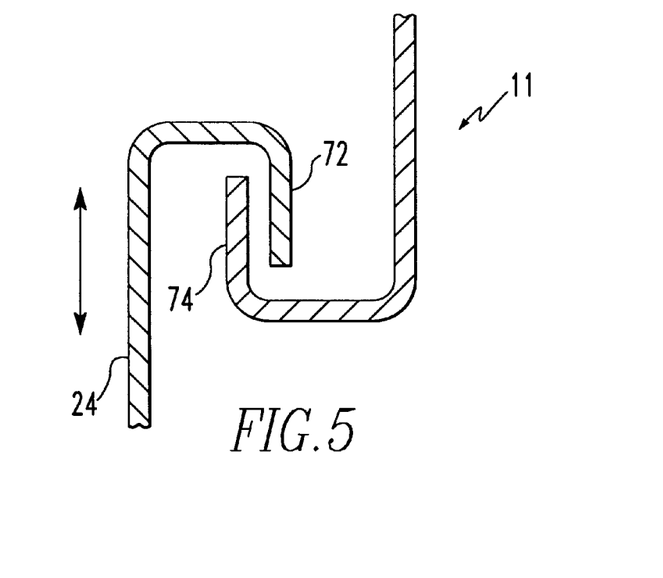
FIG. 5 is a fragmentary cross-section through overlapping flanges at the top of the upper door and door opening in the switchgear of FIGS. 1 and 2 in the locked position of the doors.
Figure 6:
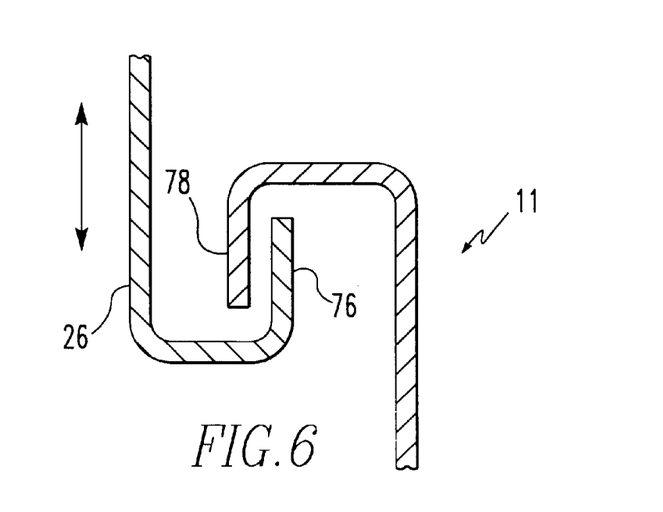
FIG. 6 is a fragmentary cross-section through overlapping flanges at the top of the lower door and door opening in the switchgear of FIGS. 1 and 2 in the locked position of the doors.

This invention also preferably includes an interlocking means between the top edge of the upper door 24 and the adjacent edge of the door opening, and an interlocking means between the lower edge of the lower door 26 and the adjacent edge of the door opening as shown in FIGS. 5 and 6. The interlocking means for the top door 24 is preferably provided in the form of a re-entrant flange 72 that projects downwardly from the top of the upper door and an outwardly disposed, upwardly projecting flange 74 on the top of the door opening (FIGS. 1 and 5). When the upper door 24 is lowered to lock it, the flange 72 on the door moves downwardly to a position behind the flange 74 on the door opening so the door is restrained against opening outwardly.

The locking means for the bottom of the lower door 26 is preferably in the form of a re-entrant flange 76 projecting upwardly from the bottom edge of the door and an outwardly disposed, upwardly projecting flange 78 at the bottom of the door opening (FIGS. 1 and 6). When the lower door 26 is in its locked position, the flange 76 on the door 26 is behind the flange 78 on the door opening to restrain the door against opening.

Figure 7:
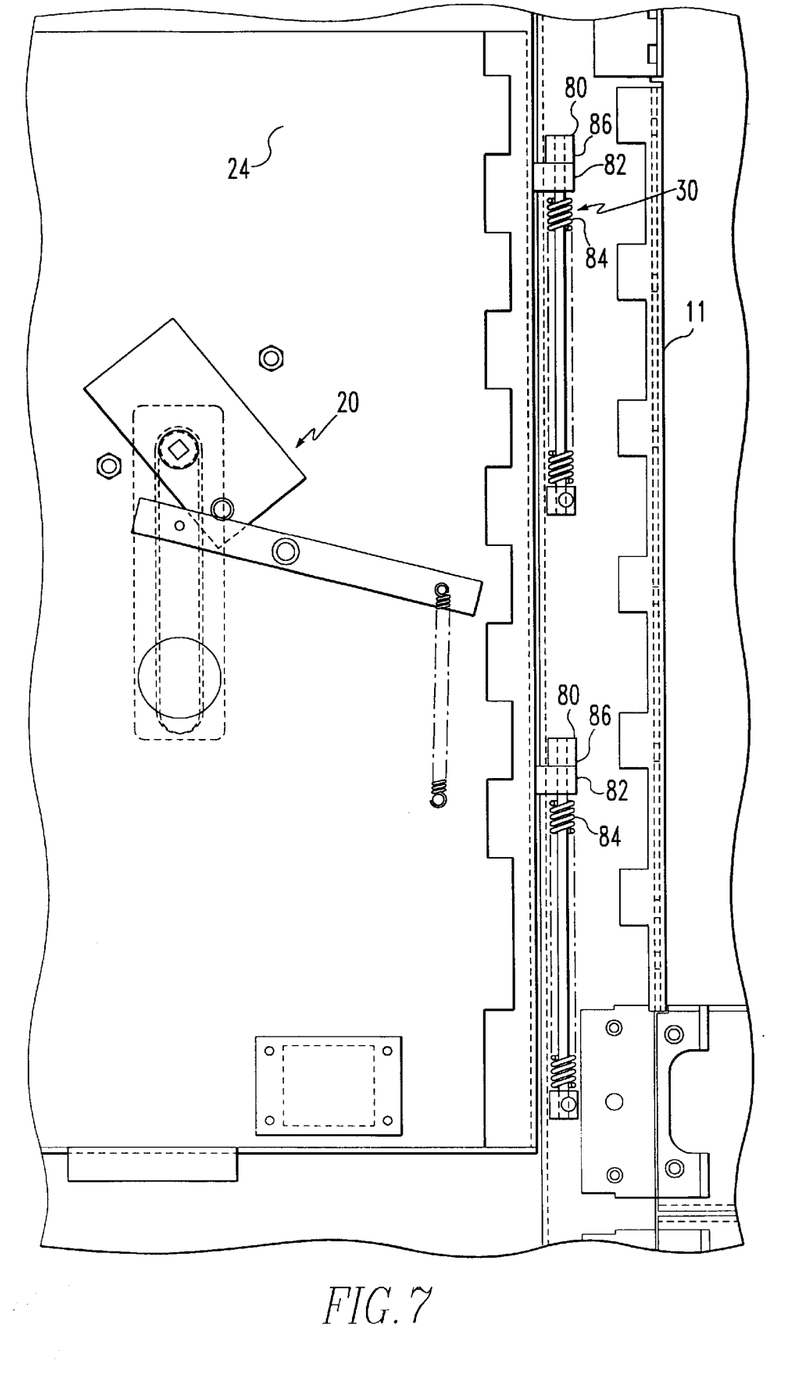
FIG. 7 is an enlarged fragmentary view of the hinge connection of the upper door on the switchgear of FIGS. 1 and 2.
Figure 8:
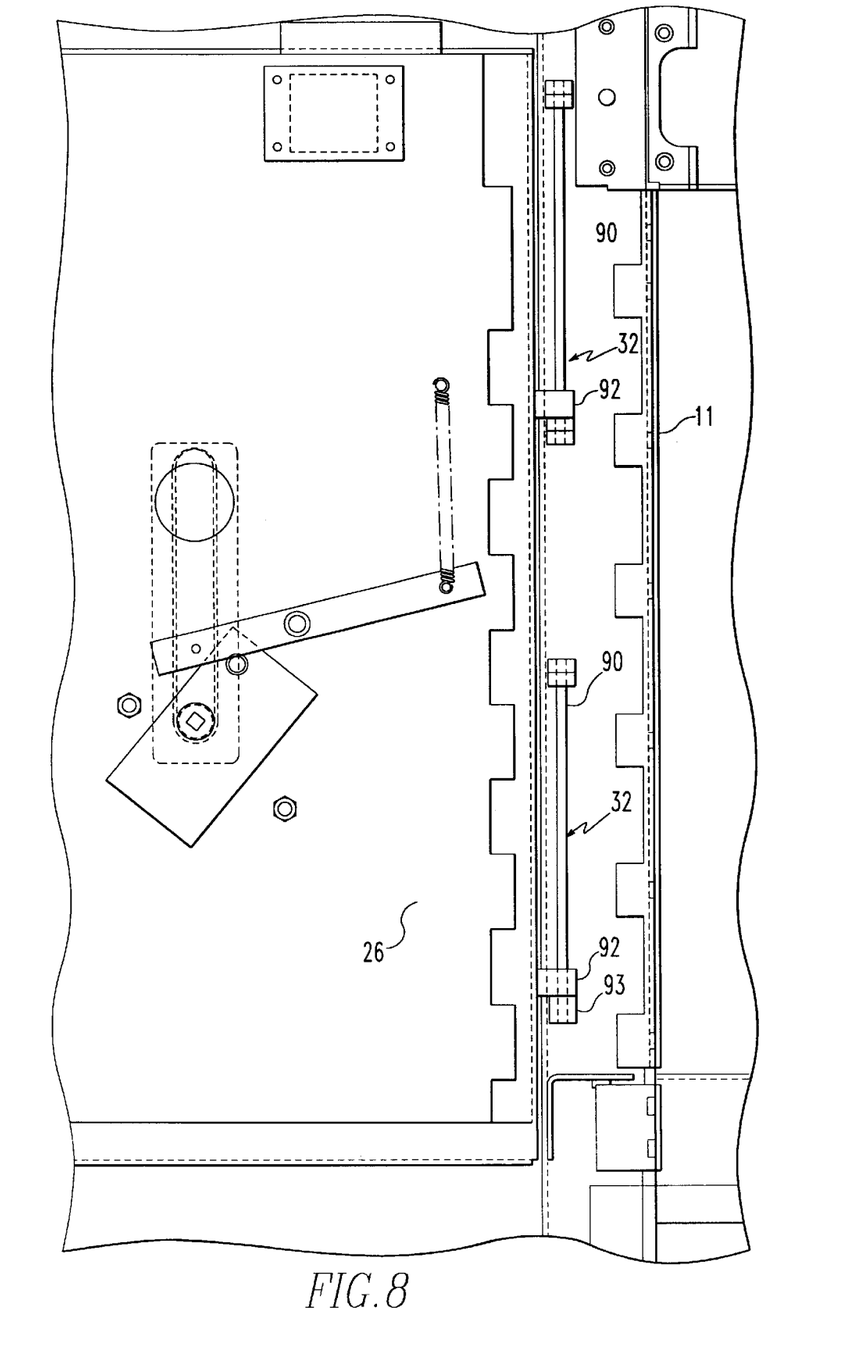
FIG. 8 is an enlarged fragmentary view of the hinge connection of the lower door on the switchgear of FIGS. 1 and 2.

FIG. 7 is an enlarged fragmentary view showing the hinges 30 that connect the upper door 24 to the enclosure 11, and FIG. 8 is a similar view of the hinges 32 that connect the lower door 26 to the enclosure. It is important that both hinge connections permit the doors 24, 26 to move up and down during locking and unlocking.

The hinge connection 30 for the upper door includes two hinge pins 80 mounted on hinge brackets 82 secured to the door 24 and brackets 86 secured to the enclosure 11 and with springs 84 on the hinge pins to lift the door when it is unlocked. When the latch mechanism 20 is operated to lower the door 24 to lock it, the springs 84 are compressed by the downward movement of the door and the hinge bracket 86 attached to the door. When the door mechanism is unlocked, the springs 84 in the hinges 30 are permitted to expand to lift the upper door.

The hinge connection 32 of the lower door 26 to the enclosure 11 as shown in FIG. 5 is similar to the upper hinge connection except that it includes no springs. When the latching mechanism 32 on the lower door 26 is unlocked, the door is lowered by the weight of the door so no spring action is required. When the latching mechanism is locked, the mechanism raises the door to locked position. The hinge connection 32 includes hinge pins 90 and hinge brackets 92 that are preferably bolted to the door 26 and brackets 93 that are bolted to the enclosure 11.

Figure 9:
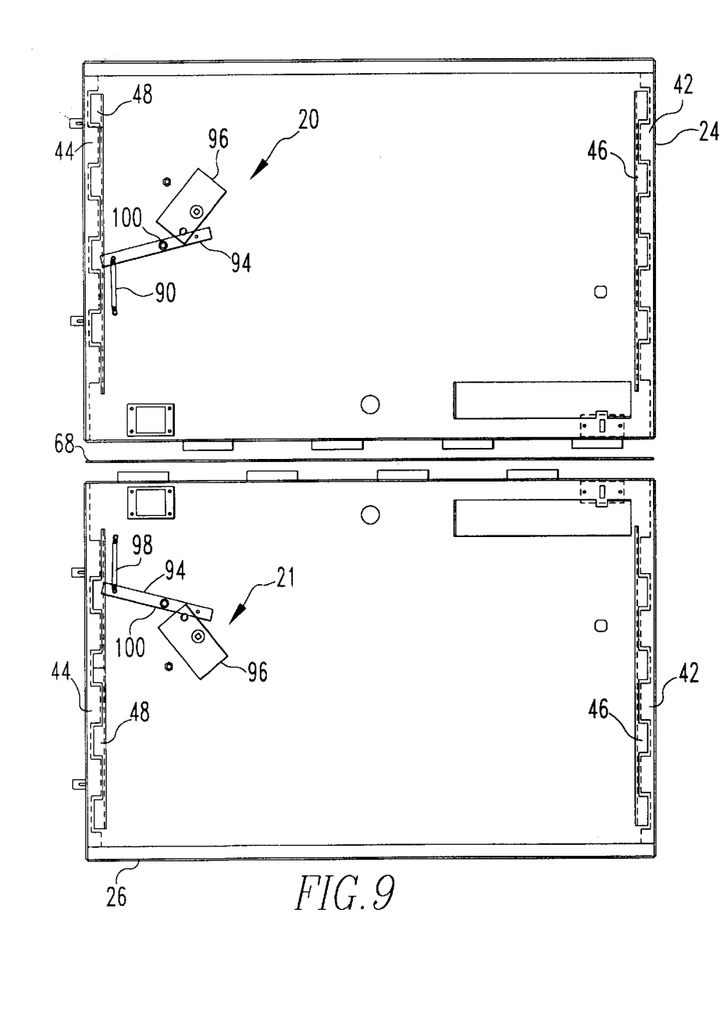
FIG. 9 shows the upper and lower doors of the switchgear of FIGS. 1 and 2, as seen from the inside of the switchgear, with both doors closed and unlocked.
Figure 10:
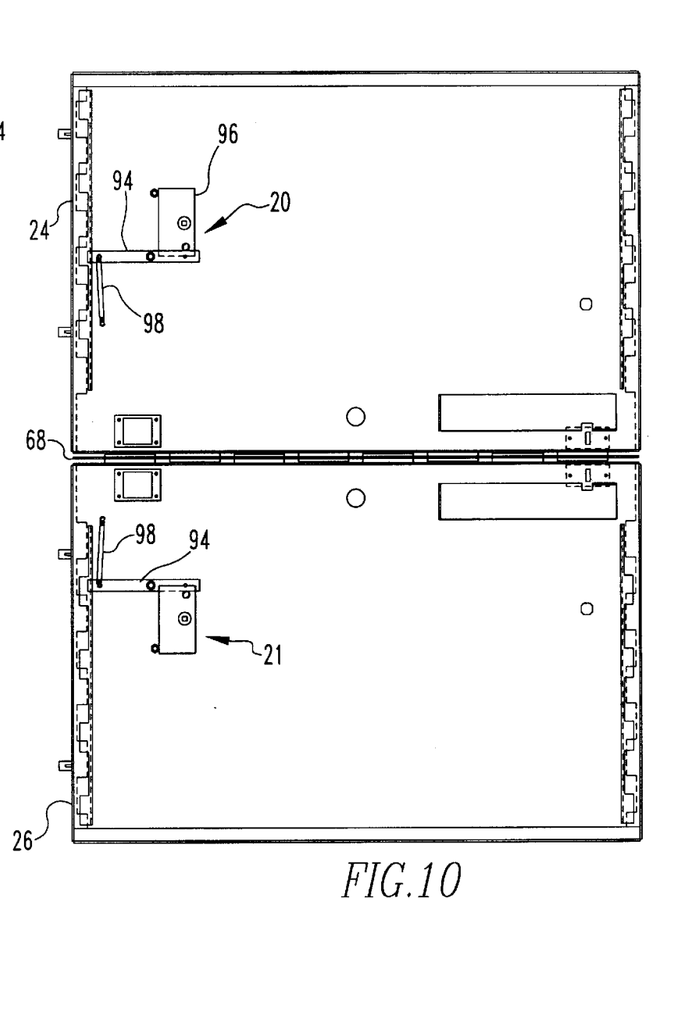
FIG. 10 shows the upper and lower doors of the switchgear of FIGS. 1 and 2, as seen from the inside of the switchgear, with both doors closed and locked.

FIGS. 9 and 10 show the doors 24, 26 as viewed from the inside of the doors and shows a division sheet 68 between the doors. FIG. 9 shows the doors in their closed but unlocked position, and FIG. 10 shows the doors in the locked position with respect to the division sheet 68 and the tabs on the vertical edges of the doors and door openings. The preferred latching mechanisms 20, 21 on the inside of the doors 24, 26 are also shown in FIGS. 9 and 10. For purposes of illustration and simplicity, the remainder of the switchgear is not shown in FIGS. 9 and 10.

The latching mechanisms 20, 21 each includes a lever arm 94, a camming assembly 96, a spring 98 and handles, not shown (on the outer face of the doors), for rotating the camming assemblies 96 to raise and lower the doors 24, 26. Each lever arm 94 is mounted on its door at a pivot pin 100 and protrudes into a slot in the edge of the enclosure 11 (FIG. 1). The springs 98 hold the lever arms against their respective cams 96. The camming members 96 are rotated by the handles, not shown, to pivot the lever arms 94 on the doors. For the lower door 26, rotation of the cam 96 turns the lever arm 94 against interference with the bottom of the slot in the enclosure 11 to raise the door. For the upper door 24, rotation of the cam 96 turns the lever arm against interference with the top of the slot in the enclosure 11 to lower the door.

As seen in FIG. 9, with the upper door 24 in its up position and the lower door in its down position, the tabs 42, 44 on the sides of the doors 24, 26 are between the tabs 46, 48 on sides of the door openings and do not overlap. In contrast, in FIG. 10 after the doors have been moved toward one another, the tabs 42, 44 on the sides of the doors are overlapped with the tabs 46, 48 on the door openings. The tabs 42, 44 on the doors are toward the interior of the enclosure from the tabs 46, 48 on the door openings. Although the flanges at the top and bottom of the openings are not shown in FIGS. 9 and 10, it is important to note re-entrant flanges on the doors 24, 26 are also not interlocked with the flanges on the enclosure in FIG. 9, but are so interlocked in FIG. 10.

It is therefore seen that this invention provides metal-clad switchgear that has upper and lower compartments that are mirror images of one another and which has improved means for preventing the doors on the compartments from being forcibly opened such as by an explosion in the switchgear. The switchgear includes a locking member between the compartments for locking against the bottom of the upper door and top of the lower door when the doors are moved in a plane toward each other. The switchgear preferably has locking tabs on the vertical sides of the doors and the door openings and the top of the upper and bottom of the lower door that lock together when the doors are moved toward one another.

While specific embodiments of the invention have been described in detail, it will be appreciated by those skilled in the art that various modifications and alternatives to those details could be developed in light of the overall teachings of the disclosure. For example, the invention may also be used on low voltage switchgear or on enclosures for MV motor starters. A variety of handle mechanisms can also be used to raise and lower the doors to lock and unlock them. Accordingly, the particular arrangement disclosed are meant to be illustrative only and not limiting as to the scope of invention which is to be given the full breath of the claims appended and any and all equivalents thereof.

What is claimed is:

1. Arc resistant metal-clad switchgear comprising:
   an enclosure having upper and lower compartments, upper and lower door openings for each upper and lower compartment respectively, a horizontal member between said openings, said upper and lower doors hingedly connected to the enclosure along a vertical side edge of each door;
   engagement means projecting downwardly along the bottom edge of said upper door and projecting upwardly from the top edge of said lower door;
   engagement means along said horizontal member for receiving said engagement means on said doors when said upper door is lowered and said lower door is raised; and
   mechanisms for lowering said upper door and raising said lower door to interlock said engagement means on said doors and said horizontal member and for raising the upper door and lowering the lower door to unlock said engagement means and permit opening the doors to provide access into said compartments.

2. Arc resistant metal-clad switchgear as set forth in claim 1 in which said engagement means along said horizontal member comprises a plurality of slots along the length of said horizontal member, said engagement means of said upper door comprises a plurality of downwardly projecting tabs along said bottom edge of said upper door mating with selected slots in said horizontal member, and said engagement means of said lower door comprises a plurality of upwardly projecting tabs along the top edge of said lower door mating with the remaining slots in said horizontal member not engaged by the tabs on said upper door.

3. Arc resistant metal-clad switchgear as set forth in claim 1 which includes a plurality of projections notches along at least one vertical side edge of each said doors and at least one vertical side edge of each said door openings which overlap when said upper door is lowered and said lower door is raised.

4. Arc resistant metal-clad switchgear as set forth in claim 3 in which both vertical side edges on both said upper and lower doors have projections on them mating with projections on both vertical side edges of both said door openings.

5. Arc resistant metal-clad switchgear as set forth in claim 1 which includes an inwardly disposed, downwardly projecting flange along the top edge of said upper door and an outwardly disposed, upwardly projecting flange along the top edge of said upper door opening which engages with said inwardly disposed, downwardly projecting flange on said upper door when the upper door is lowered to the closed position.

6. Arc resistant metal-clad switchgear as set forth in claim 1 which includes an inwardly disposed, upwardly projecting flange along the bottom edge of said lower door and an outwardly disposed, downwardly projecting flange along the bottom edge of said lower door opening which engages with said inwardly disposed, upwardly projecting flange on said lower door when the lower door is raised to the closed position.

7. Arc resistant metal-clad switchgear as set forth in claim 1 in which said upper and lower doors are connected to said enclosure by hinges, and the hinge for said upper door includes at least one spring which lifts the upper door when the door is unlocked to allow the door to open and close freely.

8. Arc resistant metal-clad switchgear as set forth in claim 1 in which said switchgear includes a fuse truck levering assembly near the bottom of said upper compartment and a fuse truck levering assembly near the top of said lower compartment.

9. Arc resistant metal-clad switchgear as set forth in claim 8 in which said upper and lower compartments and the fuse truck levering assemblies in the compartments are mirror images of one another.

10. Arc resistant metal-clad switchgear comprising:
    an enclosure having upper and lower fuse truck compartments, upper and lower door openings for each upper and lower compartment respectively, a horizontal member between said openings and upper and lower doors hingedly connected to said enclosure along a vertical side edge of each door;
    engagement means along the top and bottom edges of said upper and lower doors and along the vertical side edge of both said doors opposite the hinge connection of the doors to said enclosure;
    engagement means along the top and bottom edges of said upper and lower door openings, along the vertical side edge of each of said openings mating with the engagement means on said doors, and along at least a portion of the length of said horizontal member mating with said engagement means along the edges of said door; and
    mechanisms for lowering said upper door and raising said lower door to interlock said engagement means and for raising the upper door and lowering the lower door to unlock said engagement means and permit opening the doors to provide access into said fuse truck compartments.

11. Arc resistant metal-clad switchgear as set forth in claim 10 in which said horizontal member has a plurality of slots in it along its length, said upper door has a plurality of downwardly projecting tabs along its bottom edge mating with selected slots in said horizontal member, and said lower door has a plurality of upwardly projecting tabs along its top edge mating with slots in said horizontal member not engaged by the tabs on said upper door.

12. Arc resistant metal-clad switchgear as set forth in claim 10 in which said engagement means along the vertical side edges of said doors and the vertical side edges of said door openings comprises a plurality of mating projections on said side edges.

13. Arc resistant metal-clad switchgear as set forth in claim 12 in which the vertical side edges on both sides of both said upper and lower doors have projections on them mating with projections in both vertical side edges of both said door openings.

14. Arc resistant metal-clad switchgear as set forth in claim 10 in which said engagement means between the top edge of said upper door and top edge of said upper door opening comprises an inwardly disposed, downwardly projecting flange along the top edge of said door and an outwardly disposed, upwardly projecting flange along the top edge of said upper door opening.

15. Arc resistant metal-clad switchgear as set forth in claim 10 in which said engagement means between the bottom edge of said lower door and the bottom edge of said lower door opening comprises an inwardly disposed, upwardly projecting flange along the bottom edge of said door and an outwardly disposed, downwardly projecting flange along the bottom edge of said lower door opening.

16. Arc resistant metal-clad switchgear as set forth in claim 10 in which said upper and lower doors are connected to said enclosure by hinges, and the hinge on the upper door includes at least one spring which lifts said upper door when the door is unlocked to allow the door to open and close freely.

17. Arc resistant metal-clad switchgear as set forth in claim 10 in which said switchgear includes a fuse truck levering assembly near the bottom of said upper compartment and a fuse truck levering assembly near the top of said lower compartment.

18. Arc resistant metal-clad switchgear as set forth in claim 17 in which said upper and lower compartments and the fuse truck levering assemblies in the compartments are mirror images of one another.

19. Arc resistant metal-clad switchgear comprising:

an enclosure having upper and lower fuse truck compartments in it, upper and lower door openings into the compartments, a horizontal flange between said door openings and upper and lower doors for closing said door openings, with each of said doors connected to said enclosure by a hinge along a vertical side edge of the door;

said enclosure having a plurality of projections along a vertical edge of each of said door openings opposite said hinge on each door opening, an inwardly and upwardly directed horizontal flange along the top of said upper door opening and an inwardly and downwardly directed flange along the bottom portion of said lower door opening, and a plurality of slots along the length of said horizontal flange;

each of said doors having notches on its vertical edge opposite its hinge connection, said notches mating with the notches in the vertical edge of the door opening;

said upper door having an inwardly disposed, downwardly projecting flange along its top edge and a plurality of downwardly projecting tabs along its bottom edge mating with some of said slots in said horizontal flange;

said lower door having an inwardly disposed, upwardly directed flange along its bottom edge and a plurality of upwardly projecting tabs along its top edge mating with some of said slots in said horizontal flange;

mechanism for lowering said upper door to interlock it with said flanges and tabs on the edges of the door and said door opening and for raising said upper door to unlock the same and permit the door to be opened; and mechanism for raising said lower door to interlock it with said flanges and tabs on the edges of the door and door opening and for lowering said lower door to unlock the same and permit the door to be opened.

20. Arc resistant metal-clad switchgear as set forth in claim 19 in which both of said doors and door openings have mating projections on both vertical side edges of the doors and openings.

21. Arc resistant metal-clad switchgear as set forth in claim 19 in which said hinge connecting said upper door to said enclosures includes at least one spring that lifts said upper door when the door is unlocked.

\* \* \* \* \*